United States Patent

Ohtomo et al.

[11] Patent Number: 5,867,263
[45] Date of Patent: Feb. 2, 1999

[54] LASER SURVEY INSTRUMENT HAVING A REFLECTION LIGHT BLOCKING MEANS

[75] Inventors: Fumio Ohtomo; Jun-ichi Kodaira; Ken-ichiro Yoshino, all of Tokyo-to, Japan

[73] Assignee: Kabushiki Kaisha TOPCON, Tokyo-to, Japan

[21] Appl. No.: 648,916

[22] Filed: May 16, 1996

[30] Foreign Application Priority Data

May 25, 1995 [JP] Japan .................................. 7-150892

[51] Int. Cl.$^6$ .............................................. G01C 15/00
[52] U.S. Cl. ............................................. 356/247; 356/248
[58] Field of Search .................... 356/247, 138, 356/248

[56] References Cited

U.S. PATENT DOCUMENTS 3,856,402 12/1974 Low et al. .
5,144,486 9/1992 Hart ........................................ 356/138

FOREIGN PATENT DOCUMENTS 0 631 110 12/1994 European Pat. Off. .
3245006 10/1991 Japan .

Primary Examiner—Samuel A. Turner
Attorney, Agent, or Firm—Nields, Lemack & Dingman

[57] ABSTRACT

A laser survey instrument, which is arranged on an optical axis of an emitted polarized irradiation light beam and is provided with a reflection light blocking means for blocking an incident reference light having a polarizing member and a ¼ wave birefringence member, whereby a harmful reflection light is blocked by the reflection light blocking means to improve detection accuracy of a signal light to be detected.

4 Claims, 3 Drawing Sheets

LASER SURVEY INSTRUMENT HAVING A REFLECTION LIGHT BLOCKING MEANS

BACKGROUND OF THE INVENTION

The present invention relates to a laser survey instrument, whereby laser beam is irradiated from a main unit to the object reflector and the laser beam reflected by the object reflector is detected, thus detecting the object reflector and confirming irradiating position of the laser beam.

To determine a reference for height in the field of public works and construction works, a laser survey instrument is now used, which irradiates a laser beam in a horizontal plane by rotary scanning to form a reference line or a reference plane laser beam.

In recent years, visible semiconductor laser has been introduced in practical application, and a laser survey instrument using the visible semiconductor laser has also appeared, facilitating visual operation for survey. In such laser survey instrument, laser output is limited from the viewpoint to ensure safety for the operator. For this reason, in the operation or measurement requiring visual confirmation of reflection of the laser beam, operation distance is comparatively short.

To overcome this disadvantage, a new type of laser survey instrument is now used in practical application, which is based on reciprocal scanning of a laser beam, raises apparent luminance of the laser beam and ensures a longer operation distance. In order to perform reciprocal scanning within a proper range, it is necessary to identify a scanning position. For this purpose, a laser survey instrument has been proposed, which detects a laser beam reflected from an object reflector installed at an operation point and detects the position of the object reflector. Further, this laser survey instrument emits laser beam in a vertical direction in addition to the laser beam emitted in a horizontal direction and projects the position of floor surface on ceiling. The projection of the laser beam to the ceiling is used for setting-out to indicate positioning on the ceiling and the like in construction work.

In such a laser survey instrument, in order to identify the object reflector, the emitted laser beam is turned to a polarized light beam, and it is designed in such manner that the polarized light reflected from the object reflector has a direction of polarization different from that of the emitted light. In so doing, it is possible to discriminate the object reflector from other unnecessary reflectors such as glass surface, which reflects the light while maintaining the direction of polarization.

In the conventional laser survey instrument as described above, the polarized light of the reflected light beam from the object reflector can be made different from the direction of polarization of the emitted light when the object reflector is used. However, the object reflector cannot be used for the laser beam running in a vertical direction such as the one projected to the ceiling. Therefore, in case a surface irradiated by the laser beam running in a vertical direction is near the survey instrument main unit or in case the irradiated surface has high reflectivity or a reflector having high reflectivity is present, a "harmful" reflected laser beam having the same polarized light as that of the emitted laser beam enters the laser survey instrument main unit, thereby causing erroneous operation in the detection of the object reflector.

SUMMARY OF THE INVENTION

It is an object of the present invention to provide a laser survey instrument for emitting a laser beam and for detecting a reflected light beam from an object reflector, by which it is possible to reliably recognize light beam reflected from the object reflector. It is also an object of the present invention to provide a laser survey instrument, by which it is possible to prevent erroneous operation in case, of laser beams emitted in a plurality of directions, an unnecessary reflection laser beam enters the laser survey instrument main unit. It is also an object of the present invention to provide a laser survey instrument, by which it is possible to interrupt a "harmful" reflection light causing noise and for improving detection accuracy and reliability. The laser survey instrument according to the present invention comprises a reflection light blocking means arranged on an optical axis of an emitted polarized irradiation light beam for blocking an incident reflection light, or it emits a polarized irradiation light beam in a plurality of directions and comprises a reflection light blocking means placed on an optical axis of at least one of the polarized irradiation light beam, or it comprises a reflection light blocking means for blocking reflection light having a birefringence member and a polarizing plate, or it comprises a reflection light blocking means having the two ¼ wave birefringence members sandwiching a polarizing member, or it comprises a reflection light blocking means having a polarizing member and a ¼ wave birefringence member arranged from the exit side of the polarized irradiation light beam, or it comprises an emitter for emitting a polarized irradiation light beam, a rotating unit for splitting the polarized irradiation light beam from the emitter in horizontal and vertical directions and for irradiating the light beams in a horizontal direction by rotary irradiation, and a reflection light blocking means for blocking an incident reflection light having a polarizing member and a ¼ wave birefringence member and arranged on an optical axis of the vertical polarized irradiation light beam, whereby the position of the object reflector is detected by the light reflected from the object reflector placed at a given position on a laser beam reference plane formed by rotary irradiation. Because a "harmful" reflection light is blocked by the reflection light blocking means, accuracy for detecting the signal light to be detected can be improved.

DETAILED DESCRIPTION OF THE PREFERRED EMBODIMENTS

Figure 1:
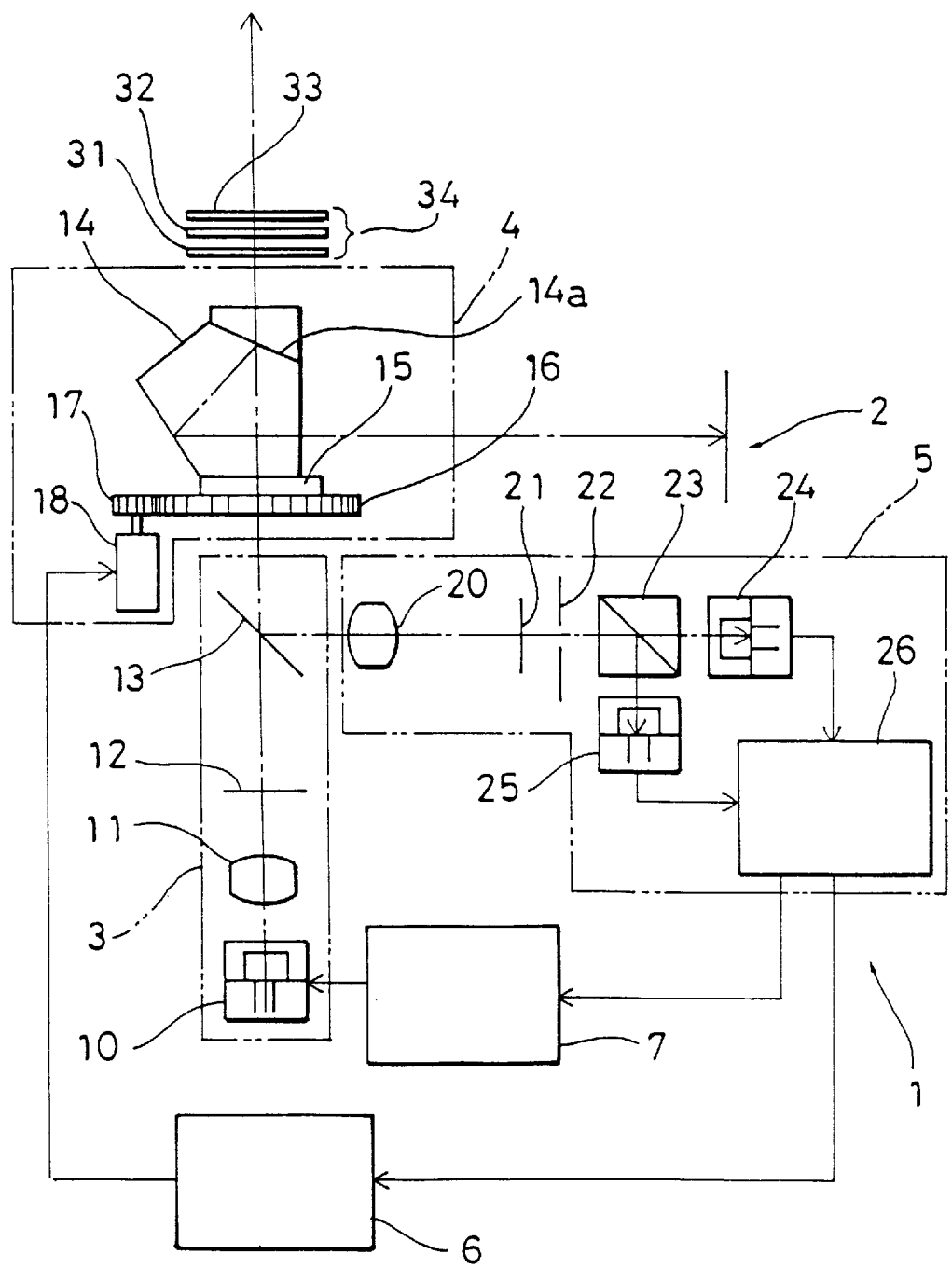
FIG. 1 is a schematical structure drawing of an embodiment of the present invention.

In the following, description will be given on an embodiment of the present invention referring to the drawings.

A laser survey instrument comprises a laser survey instrument main unit 1 and an object reflector 2 arranged at a position separated from the laser survey instrument main unit 1.

First, the laser survey instrument main unit 1 is described.

The laser survey instrument 1 primarily comprises an emitter 3, a rotating unit 4, a reflection light detector 5, a rotation controller 6, and a light emitting element driving unit 7.

Now, the emitter 3 is described.

On an optical axis of a laser diode 10 emitting a linearly polarized irradiation light beam, a collimator lens 11, a first ¼ wave birefringence member 12 and a perforated mirror 13 are arranged in this order as seen from the laser diode 10. The linearly polarized irradiation light beam emitted from the laser diode 10 is turned to parallel beams by the collimator lens 11 and is converted to circularly polarized light by the first ¼ wave birefringence member 12. The circularly polarized irradiation light beam is irradiated toward the rotating unit 4 via the perforated mirror 13.

The rotating unit 4 splits a part of the polarized irradiation light beam from the emitter 3, thereby irradiating the light beam for scanning in a horizontal direction, and it also irradiates the remaining polarized irradiation light beam in a vertical direction. A pentagonal prism 14 is arranged on a rotary support 15, which is rotated around the optical axis of the polarized irradiation light beam. The top surface 14a of the pentagonal prism 14 serves as a half-mirror, which splits and irradiates the polarized irradiation light beam from the emitter 3 in a direction deviated by 90° (horizontal direction) and in a vertical direction. The rotary support 15 is connected to a scanning motor 18 via a driven gear 16 and a driving gear 17.

Above the rotating unit 4 and on a rotation axis of the pentagonal prism 14, a reflection light blocking means 34 is arranged, which comprises a third ¼ wave birefringence member 31, a polarizing member 32, and a fourth ¼ wave birefringence member 33 arranged in this order as seen from the pentagonal prism 14. The third ¼ wave birefringence member 31, the polarizing member 32, and the fourth ¼ wave birefringence member 33 may be integrated instead of three-layer arrangement.

The polarized reflection light beam from the object reflector 2 is designed to enter the rotating unit 4. Upon entering the pentagonal prism 14, the polarized reflection light beam is deflected toward the perforated mirror 13 of the emitter 3 by the pentagonal prism 14, and the polarized reflection light beam is irradiated to the reflection light detector 5 by the perforated mirror 13.

Next, description will be given on the reflection light detector 5.

On the optical axis of the reflection light from the perforated mirror 13, a condenser lens 20, a second ¼ wave birefringence member 21, a pinhole 22, a polarized light beam splitter 23, and a first photodetector 24 comprising a photodiode and the like are arranged in this order as seen from the perforated mirror 13. On an optical axis of the reflection light of the polarized light beam splitter 23, a second photodetector 25 comprising a photo diode and the like is arranged. The outputs from the first photodetector 24 and the second photodetector 25 are inputted to a reflection light beam detection circuit 26.

The polarized light beam splitter 23 splits the polarized reflection light beam entering the reflection light detector 5 and irradiates the light beams toward the first photodetector 24 and the second photodetector 25. The second ¼ wave birefringence member 21 and the polarized light beam splitter 23 are arranged in such manner that the light beam having the same direction of polarization as that of the polarized reflection light beam, which has been emitted from the emitter 3 and has passed through the ¼ wave birefringence members twice and returned to the main unit enters the first photodetector 24, and that the polarized reflection light beam returning the main unit with the same direction of polarization as the polarized irradiation light beam emitted from the emitter 3 enters the second photodetector 25.

The rotation controller 6 controls the rotation of the scanning motor 18 based on the signal from the reflection light detector 5. When the reflection light detector 5 detects the object reflector 2, the polarized irradiation light beam emitted from the emitter 3 is reciprocally scanned around the object reflector 2.

The light emitting element driving unit 7 performs pulse modulation of the polarized irradiation light beam emitted from the laser diode 10 according to a clock signal from the reflection light beam detection circuit 26.

Figure 2:
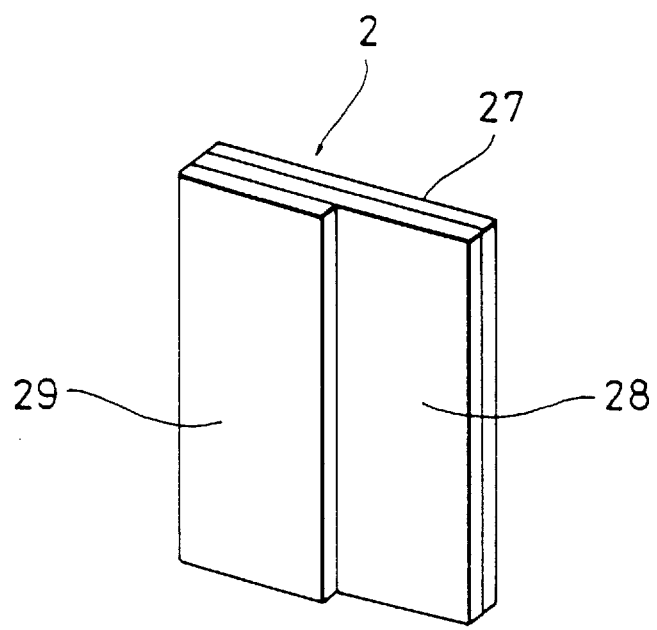
FIG. 2 is a perspective view of an object reflector used in the above embodiment.

Description will be given now on the object reflector 2 in connection with FIG. 2.

On a substrate 27, a reflection layer 28 is formed, and a ¼ wave birefringence member 29 is attached on the left half in the figure. Thus, the exposed portion of the reflection layer 28 constitutes a reflecting section, which reflects the light with maintaining the direction of polarization of the incident light beam, and the ¼ wave birefringence member 29 constitutes a polarized light converted reflecting section, which reflects the light with converting the direction of polarization with respect to the incident light beam. The reflection layer 28 is made of a retroreflection material where a plurality of very small corner cubes or spherical reflectors and the like are constituted. The ¼ wave birefringence member 29 exerts such action on the incident light beam that the polarized reflection light beam generates phase difference of $\lambda/4$.

In the following, description will be given on operation.

The polarized irradiation light beam emitted from the laser diode 10, which is driven by the light emitting element driving unit 7, is modulated based on a clock signal from the reflection light beam detection circuit 26. The linearly polarized irradiation light beam emitted from the laser diode 10 is turned to parallel beam by the collimator lens 11 and is turned to a circularly polarized irradiation light beam as it passes through the first ¼ wave birefringence member 12. The circularly polarized irradiation light beam passes through the perforated mirror 13 and is split in horizontal and vertical directions by the pentagonal prism 14 and is irradiated. First, description will be given on the polarized irradiation light beam irradiated in a horizontal direction.

The pentagonal prism 14 is rotated by the scanning motor 18 via the driving gear 17 and the driven gear 16. The pentagonal prism 14 is first rotated over the entire periphery, and the polarized irradiation light beam irradiated from the pentagonal prism 14 scans over the entire periphery.

By total peripheral scanning, the polarized irradiation light beam passes through the object reflector 2. When passing through it, the polarized irradiation light beam is reflected by the object reflector 2, and the polarized reflection light beam enters the pentagonal prism 14.

As described above, one-half of the surface of the object reflector 2 is merely the reflection layer 28, and the ¼ wave birefringence member 29 is attached on the remaining one-half. Therefore, the polarized reflection light beam reflected by the exposed portion of the reflection layer 28 is a circularly polarized light which maintains the polarizing condition of the incident polarized irradiation light beam. The polarized reflection light beam, which has passed through the ¼ wave birefringence member 29, and being reflected by the reflection layer 28, has further passed through the ¼ wave birefringence member 29, is a circularly polarized light, which has rotating direction different from the polarizing condition of the incident polarized irradiation light beam.

The polarized reflection light beam reflected by the object reflector 2 is deflected by 90° by the pentagonal prism 14 and enters the perforated mirror 13, and the perforated mirror 13 reflects the reflection light toward the condenser lens 20. The condenser lens 20 irradiates the reflection light beam as convergent light toward the second ¼ wave birefringence member 21. The reflection light beam returning as a circularly polarized light is converted to a linearly polarized light by the second ¼ wave birefringence member 21 and enters the pinhole 22. As described above, the reflection light beam reflected by the exposed portion of the reflection layer 28 has a rotating direction different from that of the reflection light beam reflected by the ¼ wave birefringence member 29. Accordingly, planes of polarization are deviated by 90° between the two reflection light beams, which have been converted to linearly polarized light beams by the second ¼ wave birefringence member 21.

The pinhole 22 fulfills such function that the reflection light beam having an optical axis deviated from and not directly facing to the polarized irradiation light beam irradiated from the main unit does not enter the photodetectors 24 and 25, and the reflection light beam passing through the pinhole 22 enters the polarized light beam splitter 23.

The polarized light beam splitter 23 fulfills the function to pass the polarized light beam having a direction of polarization deviated by 180° from that of the polarized irradiation light beam emitted from the emitter 3 and to reflect the polarized light beam having a direction of polarization deviated by 90° from the polarized irradiation light beam emitted from the emitter 3. The reflection light beam passing through the polarized light beam splitter 23 is split into polarized light components, which cross perpendicularly each other by the polarized light beam splitter 23, and the photodetectors 24 and 25 receive the split reflection light beams respectively. The signals from the photodetectors 24 and 25 are inputted to the reflection light beam detection circuit 26.

Light receiving conditions of the first photodetector 24 and the second photodetector 25 are as follows: When the polarized reflection light beam passing through the ¼ wave birefringence member twice outside the main unit, i.e. the polarized reflection light beam reflected by the ¼ wave birefringence member 29 of the object reflector 2, enters the reflection light detector 5, the amount of light entering the first photodetector 24 is higher than the amount of light entering the second photodetector 25 because of the relationship between the second ¼ wave birefringence member 21 and the polarized light beam splitter 23. Also, when the polarized reflection light beam not passing through the ¼ wave birefringence member, i.e. the polarized reflection light beam reflected by the exposed portion of the reflection layer 28 of the object reflector 2 or by other unnecessary reflector, enters the reflection light detector 5, the amount of the light entering the second photodetector 25 is larger than the amount of the light entering the first photodetector 24.

The difference of the amount of incident light to the first photodetector 24 and the second photodetector 25 is comparatively calculated by the reflection light beam detection circuit 26. By finding the difference of the amount of the incident polarized reflection light beams to the first photodetector 24 and the second photodetector 25, it is possible to identify whether the incident polarized reflection light beam has been reflected by the exposed portion of the reflection layer 28 of the object reflector 2 or it has been reflected by the ¼ wave birefringence member 29. By detecting a point where the difference between outputs of the first photodetector 24 and the second photodetector 25 changes, it is possible to identify that the detected point is the center of the object reflector 2.

The identification signal obtained by the reflection light detection circuit 26 is inputted to the rotation controller 6. The rotation controller 6 rotates the scanning motor 18 in normal and reverse directions within a given range on or around the point where the object reflector 2 has been identified, and the area within the given range is reciprocally scanned by the polarized reflection light beam irradiated from the rotating unit 4.

Figure 3:
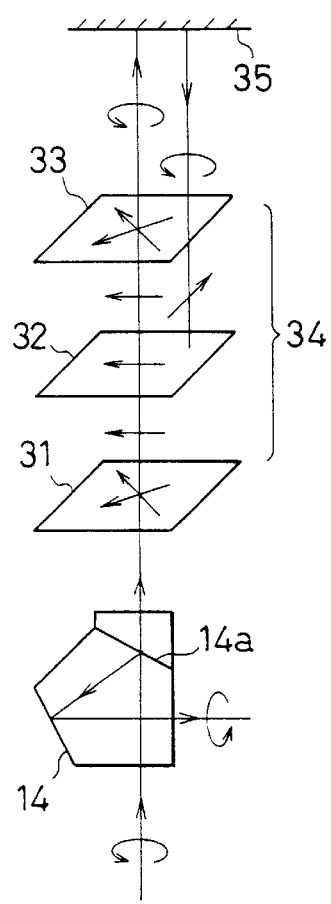
FIG. 3 is a drawing for explaining an essential portion of an embodiment of the present invention.

Next, description will be given on the polarized irradiation light beam irradiated in a vertical direction from the pentagonal prism 14, referring to FIG. 3.

The polarized irradiation light beam irradiated from the pentagonal prism 14 is converted to a linearly polarized light as it passes through the third ¼ wave birefringence member 31. It is designed in such manner that the direction of polarization of the polarizing member 32 agrees with the direction of polarization of the polarized irradiation light beam converted by the third ¼ wave birefringence member 31, and the polarized irradiation light beam passes through the polarizing member 32 just as it is. The fourth ¼ wave birefringence member 33 has its crystal axis inclined by 45° with respect to the direction of polarization of a linearly polarized light from the polarizing member 32. By passing through the fourth ¼ wave birefringence member 33, the light beam is converted to a circularly polarized light and is projected to a ceiling surface 35.

After being reflected by the ceiling surface 35, the polarized reflection light beam is converted to a linearly polarized light having a direction of polarization deviated by 90° as it passes through the fourth ¼ wave birefringence member 33. The polarized reflection light beam having a direction of polarization deviated by 90° from that of the polarizing member 32, being blocked by the polarizing member 32 and reflected by the ceiling surface 35, does not enter the laser survey instrument main unit 1. Therefore, the reflection light detector 5 is not erroneously operated due to reflection light from the ceiling surface 35.

Figure 4:
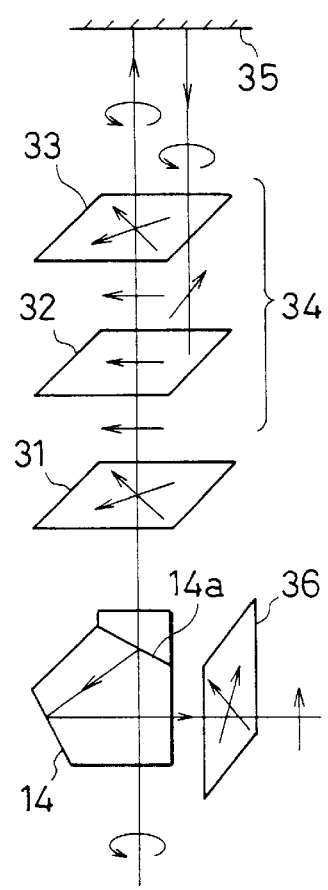
FIG. 4 is a drawing for explaining an essential portion of another embodiment of the present invention.

In an embodiment shown in FIG. 4, a fifth ¼ wave birefringence member 36 is arranged on the exit side of the pentagonal prism 14, and the fifth ¼ wave birefringence member 36 is integrally rotated with the pentagonal prism 14. In this case, the polarized irradiation light beam irradiated in a horizontal direction from the pentagonal prism 14 is turned to a linearly polarized light. Basically, this is the same as the case of a circularly polarized light irradiated in a horizontal direction.

Figure 5:
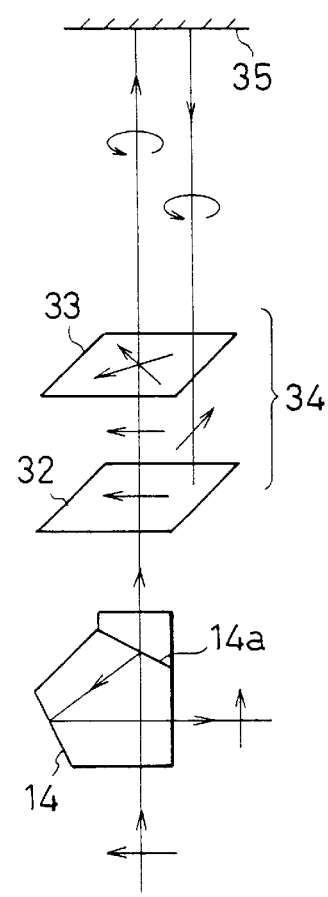
FIG. 5 is a drawing for explaining an essential portion of a still another embodiment of the present invention.

FIG. 5 shows the case where the polarized irradiation light beam irradiated from the pentagonal prism 14 is a linearly polarized light. In this case, the third ¼ wave birefringence member 31 in the above embodiment can be omitted, and a reflection light blocking means 34 is integrally rotated with the pentagonal prism 14. In the embodiment shown in FIG. 5, the direction of polarization of the polarizing member 32 is made equal to the direction of polarization of the polarized irradiation light beam irradiated from the pentagonal prism 14. In the embodiments shown in FIGS. 3 and 4, there is no need to integrally rotate the reflection light blocking means 34 with the pentagonal prism 14.

It is needless to say that the present invention is not limited to the laser rotary irradiation system and it can be applied to a laser reference level setting device for forming a fixed reference line. The present invention is applicable for length measurement by laser. In this case, the better S/N ratio of signal can be obtained because a reflection light causing noise can be blocked.

As described above, the system according to the present invention has such arrangement that light beam from one light emitting source is split and is emitted in vertical and horizontal directions. Thus, lower power consumption and longer operating time can be assured by simple arrangement, and it is possible to reliably discriminate the reflection light beam coming from the object reflector from the reflection light beam coming from a reflector, which is different from but is optically similar to the object reflector. Further, the better S/N ratio of signal can be obtained in length measurement by laser because a "harmful" reflection light can be blocked.

What we claim are:

1. A laser survey instrument, comprising emitter means for emitting a polarized irradiation light beam, a rotating unit for dividing said polarized irradiation light beam into horizontal and vertical directions and for irradiating said divided polarized light beams in the horizontal and vertical directions, respectively, said light beam irradiated in said horizontal direction being rotated, said light beam irradiated in said vertical direction having an optical axis, and reflection light blocking means arranged on said optical axis for blocking an incident reflection light beam so as to receive only a reflection light beam of said polarized light beam divided in said horizontal direction.

2. A laser survey instrument, according to claim 1, wherein the reflection light blocking means for blocking reflection light comprises a polarizing member and a ¼ wave birefringence member.

3. A laser survey instrument, according to claim 1, wherein the reflection light blocking means comprises two ¼ wave birefringence members sandwiching a polarizing member.

4. A laser survey instrument, according to claim 2, wherein the reflection light blocking means comprises two ¼ wave birefringence members arranged from the exit side of the polarized irradiation light beam.

* * * * *